United States Patent Office 3,146,256
Patented Aug. 25, 1964

3,146,256
PREPARATION OF ALPHA-BETA, DELTA-EPSILON UNSATURATED CARBOXYLIC DERIVATIVES
Gian Paolo Chiusoli, Milan, Italy, assignor to Montecatini Societa Generale per l'Industria Mineraria e Chimica, Milan, Italy
No Drawing. Filed Oct. 7, 1958, Ser. No. 765,739
Claims priority, application Italy Oct. 10, 1957
19 Claims. (Cl. 260—464)

The present invention relates to a process for preparing alpha-beta, delta-epsilon-unsaturated carboxylic compounds, more precisely the acids and esters, by reacting unsaturated chloro-derivatives, acetylene, carbon monoxide, nickel-carbonyl and hydroxyl compounds.

It is known that allyl chloro-derivatives, by treatment with nickel carbonyl under atmospheric pressure, yield duplication products.

It is also known that acetylene, by treatment with nickel carbonyl in the presence of water and/or alcohols, yields acrylic acid and acrylic esters.

It has now been found by the applicant that, if acetylene and a chloro-derivative of the allyl type are reacted with nickel-carbonyl in the presence of hydroxylic solvents (ROH), a product is obtained which results from the linear combination of ROH, carbon monoxide, acetylene and the chloro-derivative. That is, carboxylic derivatives containing 3 carbon atoms more than the starting chloro-derivatives are obtained.

The preparation of compounds of this type has heretofore required operations which were often so very difficult and complex that some of the compounds whose preparation will be described hereinbelow appear to be unknown until the present time.

Their preparation by another method would have required, for instance, the chlorination and dehydrochlorination of aliphatic and olefinic molecules having one carbon atom less than the product to be obtained, with the possibility of forming other isomers, and the cyanuration and saponification of the chloro-derivatives thus obtained. In contrast, by the process hereunder described, it is possible to obtain the synthesis of a wide variety of unsaturated carboxylic compounds in a surprisingly facile manner since the process can be carried out at room temperature, or at a not very different temperature, under atmospheric pressure, and the desired product is obtained in a single stage.

In this way a considerable number of carboxylic acids and esters thereof becomes easily accessible, either in the unsaturated or in the saturated form, the latter being easily obtainable from the first one by conventional hydrogenation methods.

Both the unsaturated and saturated compounds have a number of uses, for instance, in the plasticizer and solvent fields, and as intermediates for the synthesis of other organic products.

The new synthesis also presents further advantages since, as starting materials, chloro-derivatives can be used containing other functional groups, such as carboxyl or hydroxyl, which makes it possible to obtain polyfunctional unsaturated acids.

The synthesis can schematically and briefly be represented by the following equation:

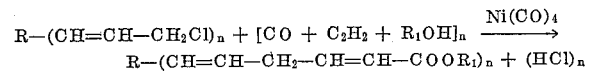

R—(CH=CH—CH₂Cl)ₙ + [CO + C₂H₂ + R₁OH]ₙ $\xrightarrow{Ni(CO)_4}$
R—(CH=CH—CH₂—CH=CH—COOR₁)ₙ + (HCl)ₙ where $n$ can be 1, 2 etc. R can be H, with $n=1$, or R can be a radical, including H, bound by a $CH_2$ group thereof to the carbon atom which has the double bond, and containing as a range of practical interest, from 0 to 20 carbon atoms. R can have other functional groups such as $COOCH_3$, $CONH_2$, $CN$. $R_1$ can be a radical of the alcohol type such as aliphatic, cycloaliphatic or arylaliphatic, containing, as a range of practical interest, from 0 to 20 carbon atoms. For example, $R_1$ can be hydrogen, methyl, isopropyl, benzyl, etc., possibly with other OH groups not bound directly to the hydroxyl, such as for instance, the ethylenic radical of glycol, and, if desired, also with other functional groups which are not reactive under the reaction conditions.

The synthesis takes place, in general, at temperatures of between 0° and 75° C. in the presence of acetylene and carbon monoxide. The temperature range for the practical execution of the reaction depends on the reactivity of the particular chloro-derivatives and alcohols used, and is in general comprised between 25° and 60° C.

The carbon monoxide needed for the synthesis is supplied by nickel carbonyl and by the CO gas introduced together with acetylene into the reaction zone.

The synthesis does not require the use of the stoichiometric amount of nickel carbonyl to form nickel chloride from the starting chloro-derivative, but only the renewal of the amount of nickel carbonyl which is lost in other ways.

The following scheme can approximately represent the action of nickel carbonyl in the synthesis:

R—CH=CH—CH₂Cl + C₂H₂ + Ni(CO)₄

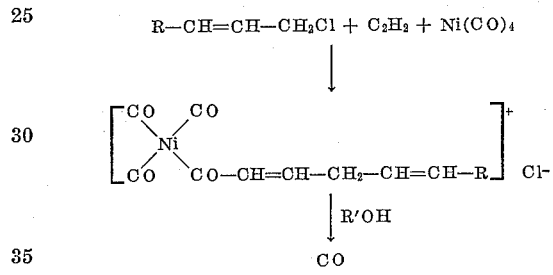

$$\left[\begin{array}{c} CO \\ \diagdown \\ CO \end{array} Ni \begin{array}{c} CO \\ \diagup \\ CO—CH=CH—CH_2—CH=CH—R \end{array}\right]^+ Cl^-$$

↓ R'OH

CO
Ni(CO)₄ + R'OOC—CH=CH—CH₂—CH=CH—R + HCl

The various substances employed react in the ratio of 1 mole of monofunctional chloroderivative per 1 mole acetylene, 1 mole CO, and 1 mole of monofunctional hydroxyl compound.

The chlorine of these derivatives, however, reacts easily with nickel carbonyl, for example to yield duplication products of the organic radical bound to the chlorine atom and nickel chloride. The nickel carbonyl consumption can therefore vary according to the ease of such side reactions of the chloro-derivative. Therefore the amount of carbon monoxide supplied as a gas is also variable.

Another cause of side reactions is the presence of hydrochloric acid, whose action however can be neutralized by employing either buffers such as $MgCO_3$, $CaCO_3$, or $NaH_2PO_4$, or by using inert solvents, such as acetone, glycol ethers, diethylketone, etc.

The use of solvents also serves to facilitate the formation of a homogeneous phase, when this is necessitated by the difficulty of dissolving the reactants.

The same reactant alcohols can be used in great excess in order to obtain good solubility as well as a dilution of free hydrochloric acid, whereby the saponification reactions during the reaction can be avoided.

This precaution is still more necessary when operating at temperatures of some degrees higher than room temperature.

In the presence of water it is convenient to dilute with inert solvents, such as acetone.

When mixtures of water and alcohols are used, esters are prevailingly formed if the water proportion is not high.

An excess of hydroxyl compound in respect of the stoichiometric amount is advantageous for the execution of the synthesis and for the yield of the useful product.

Also an excess of acetylene in respect of the chlorine of the reacting chloro-derivative is useful, and it should preferably be higher than 20%. There must however be taken into account the fact that, in the presence of hydrochloric acid and acetylene, the latter being in excess with respect to the chloro-derivative and CO, the reaction which leads to the formation of acrylic acid and acrylic esters is promoted.

In order to limit this reaction, it is useful to operate with a gaseous mixture containing a sufficient amount of CO. By operating without CO in the gaseous mixture, higher amounts of acrylic acid or esters thereof and of other by-products are formed while increasing the nickel carbonyl consumption.

Nickel carbonyl should also be present in the reaction zone, preferably in excess of the reacting chloro-derivative. When operating with a gas current, the excess of nickel carbonyl in respect of the amount required for the reaction, is prevailingly removed by the gases which, if desired, can be recycled.

At the end of the reaction nickel carbonyl is found in the form of nickel chloride.

The chloro-derivatives to be used for the reaction are of the allyl type. Their preparation can be carried out by various methods, mainly by direct chlorination of olefines, such as the preparation of allyl chloride from propylene and chlorine; by addition of hydrochloric acid to dienes as in case of crotyl chloride from butadiene and hydrochloric acid; by chlorination of unsaturated alcohols with $PCl_3$ or HCl as in case of chloroacetoxy butene from acetoxy butenol; and further by dehydrochlorination of dichloro-derivatives or dehydration of chloro-alcohols.

In practice, the reaction is carried out very easily. Into a vessel, containing the solvent or the hydroxyl compound or both, kept in agitation under a gaseous stream of carbon monoxide and acetylene, the chloro-derivatives and nickel carbonyl, alone or in solution, are introduced preferably at a flow-rate which makes it possible to control the reaction heat. At length, or almost immediately if oxygen has carefully been removed from the reaction equipment, the solution assumes a yellow to brown-red color, which changes to a green color.

The rate of addition of the reactants should conveniently be adjusted so as to avoid the change to the green color, this in order to avoid excessive nickel carbonyl consumption. The heat of reaction can also be controlled by the usual cooling systems known to persons skilled in the art.

The low temperature causes the secondary reaction to decrease. The reaction time depends on the temperature and on the particular nature of the chloro-derivative used.

By operating continuously with gas circulation, there is the advantage of introducing nickel carbonyl amounts a little higher than those actually consumed during the reaction, thus reducing the losses.

Careful control of the reaction conditions is facilitated by keeping constant the composition of the circulating gaseous mixture and by introducing fresh gas in the cycle, according to the reaction requirements. Accordingly an increase in the yield and a decrease in the nickel carbonyl consumption occur.

The gaseous mixture which is circulated through the liquid contains acetylene and carbon monoxide in proportions that are preferably shifted a little towards increased acetylene, with respect to the proportions resulting from taking into account that the addition of carbon monoxide to acetylene takes places in the ratio of 1:1 and that a portion of the carbon monoxide is yielded by nickel carbonyl. The portion yielded by nickel carbonyl can vary according to the nature of the chloro-derivative used and the reaction conditions.

In case of chlorocyano-butene it is preferable to keep the concentration of acetylene in the gas at between 55 and 75% and that of carbon monoxide at between 24 and 45%. An effective gas circulation favors the mixing and has a favorable influence on the course of the reaction.

The slow and regular introduction of the reactants in diluted solution favors the reaction and allows the best results to be obtained.

Diluted solutions are preferably used, so that, in total, more than 10 parts solvent are introduced per 1 part chloro-derivative.

At the end of the reaction it is convenient to neutralize the free hydrochloric acid, to distill first the alcohol and the solvent and then the product, either directly or after having added water and separated the nickel chloride solution.

In case that acids are produced, they can be withdrawn as alkaline salts and then freed by acidification.

The residual nickel chloride solution allows the nickel to be easily recovered as carbonyl, by using the known method already employed for recovering nickel in the synthesis of acrylic esters from acetylene. In fact, by transforming it into nickel hydroxide or into an ammonium complex, and subjecting the suspension or solution thus obtained to the action of carbon monoxide under pressure, nickel carbonyl can be obtained without any difficulty.

The products obtained, as we have already said, are characterized in that carbon atom groupings are present, containing two mutually non-conjugated double bonds, one of which is in conjugated relation to the carboxylic group. The products have the double bond conjugated with the carboxylic group, and are prevailingly in the cis form, and are rather stable. By heating to about 250° C., the transformation into the trans form in general takes place quickly, together with side reactions.

These products can easily be hydrogenated by the methods known to those skilled in the art. Saturated derivatives, many of which having a wide use, are thus obtained.

Some of the compounds obtained by this synthesis deserve to be mentioned due to their practical importance and the cheapness of the raw materials used. Particularly interesting are 7-cyano-2,5-heptadienoic acid and its esters, which are obtained from 1-chloro-4-cyano-butene-2.

7-cyano-2,5-heptadienoic-1 acid was separated as a viscous oil. The methyl ester of this acid distills at 134–138° C./7 mm. Hg, $n_D^{20}$ 1.4788. The isopropyl ester distills at 160–165°/13 mm. Hg. The cyclohexyl ester on the contrary distills at 180–183/5 mm. Hg.

2,5-hexadienoic-1 acid,

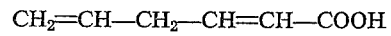

was isolated as a liquid having a boiling point of 95–105°C./12 mm. Hg. Caproic acid is obtained by hydrogenation of this acid.

The methyl ester of 2,5-hexadienoic-1 acid boils at 63–66°C./34 mm. Hg; $n_D^{20}$ 1.4495. Its ethyl ester boils at between 50 and 55°C./10 mm. Hg; its isopropyl ester at 36–42°C./5 mm. Hg; and its benzyl ester at 150–165°C./20 mm. Hg.

From crotyl chloride, obtainable from butadiene and hydrochloric acid, 2,5-heptadienoic acid

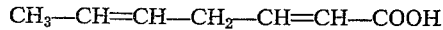

was obtained as a liquid boiling at 117–124° C./15 mm. Hg. By hydrogenation, enanthic acid is obtained.

The methyl ester of this acid boils at about 72–75°C./20 mm. Hg, $n_D^{20}$ 1.4567.

From chloroacetoxybutene, obtainable from 1,4-dichlorobutene-2 and sodium acetate, the methyl ester of 7-acetoxy-2,5-heptandienoic acid was obtained, a liquid boiling at 122–129°C./6 mm. Hg having the following formula:

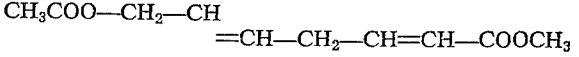

From the methyl ester of 5-chloro-3 pentenoic acid was obtained the methyl diester of 2,5-octadiendioic acid, a liquid with a boiling point of 133–138°C./8 mm. Hg, having the formula:

$$H_3C-OOC-CH=CH-CH_2-CH=CH-CH_2-COOCH_3$$

By hydrogenation of this ester, methyl suberate is obtained.

From 1,8-dichloro-2,6-octadiene, obtained by chlorination of the duplication product of chloroacetoxy butene, methyl tetradeca-2,5,9,12-tetraendioate, isolated as a liquid $$H_3C-OOC-CH=CH-CH_2-CH=CH-CH_2-CH_2-CH=CH-CH_2-CH=CH-COOCH_3$$

By hydrogenation on Pd in methanol, the methyl tetradecandioate is obtained, a known product which crystallizes during the hydrogenation; melting point 41° C.

Some illustrative examples, which are not intended to limit the scope of the present invention, are reported below.

The term "saturated hydrocarbon radicals" means radicals having no multiple carbon-to-carbon bonds and having only carbon and hydrogen atoms. The term "such hydrocarbon radicals further substituted by a radical of the groups consisting of Cl, CN, —OCOCH$_3$, and boiling at about 200–210°/10 mm. Hg is obtained; having —COOCH$_3$" means radicals having no multiple carbon-to-carbon linkages and consisting only of carbon atoms, the formula: and hydrogen atoms linked to carbon atoms, except for the substitution of hydrogen by a radical of said group.

Example 1

In a 500 cc. flask containing 200 cc. methyl alcohol and provided with a stirrer, reflux condenser, thermometer, gas inlet pipe, and two separatory funnels joined in a single stem dipping in the liquid, acetylene at a rate of 10 liters per hour is passed at 45° C., after washing thereof with nitrogen, meanwhile two 100-cc. methanol solution are dropped in, containing 30 g. nickel carbonyl and 40 g. 1-chloro-4-cyanobutene-2

$$\left(Cl-\overset{H_2}{C}-\overset{H}{C}=\overset{H}{C}-\overset{H_2}{C}-CN\right)$$

respectively.

After a 4-hour reaction, the whole is cooled and the alcohol is distilled off together with a little methylacrylate. The residue is taken up again with water, the double layer is separated, dried on sodium sulfate and distilled, thus collecting 25 g. of the fraction distilling at 140–150° C. under 13 mm. Hg, which contains the methyl ester of 7-cyano-2,5-heptadienoic acid.

From the nickel content of the aqueous solution it appears that 25 g. nickel carbonyl have reacted.

Analysis of the distillate.—Found: C, 64.91%; H, 6.87%; N, 8.06%. Calculated for $C_9H_{11}NO_2$: C, 65.44%; H, 6.71%; N, 8.48%.

Example 2

In a 500 cc. flask provided with stirrer, reflux condenser, thermometer, gas inlet pipe and two separatory funnels joined in a single stem, a mixture of 10 liters per hour of acetylene and 10 liters per hour of carbon monoxide is introduced at 45° C., after washing with nitrogen. The gas is bubbled through a pipe immersed in 200 cc. methanol.

Through both funnels equal volumes of two solutions containing respectively 50 g. nickel carbonyl and 40 g. chlorocyanobutene in 100 cc. methanol are dropped in, within 3 hours; 13 g. nickel carbonyl come out with the gas. Introduction of gases is continued until the solution assumes a greenish color. It is then cooled, nitrogen is passed in and methyl alcohol and a little nickel carbonyl are distilled off. The residue is taken up again with water and a double layer is separated. After drying on sodium sulfate and distilling at 140–160° C./13 mm. Hg, 40 g. of the methyl ester of 7-cyano-2,5-heptadienoic acid, consisting of a liquid which becomes quickly yellow, are obtained. From the nickel content of the aqueous solution it appears that 15 g. nickel carbonyl have been decomposed.

Example 3

Into a 1000 cc. flask provided with stirrer, reflux condenser, thermometer, gas inlet pipe and two separatory funnels joined in a single stem, a mixture of 10 liters/h. acetylene and 10 liters/h. carbon monoxide is introduced at 35° C., after washing with nitrogen. The gas is bubbled through 400 cc. methanol. Equal volumes of two methanol solutions containing, in 100 cc., respectively 30 g. nickel, carbonyl and 40 g. chlorocyanobutene, are dropped in within 6 hours. Operating as in the preceding example, a fraction weighing 45 g. and containing the methyl ester of 7-cyano-2,5-heptadienoic acid is distilled at between 140 and 160° C. under 13 mm. Hg.

From the nickel content of the aqueous solution it appears that 6 g. nickel carbonyl have been decomposed.

Example 4

In a flask equipped with stirrer, reflux condenser, thermometer, gas inlet pipe and separatory funnels, 100 cc. acetone and 10 cc. water are placed. The temperature is raised to 40° C. and a stream of 6 liters/h. acetylene and 6 liters /h. carbon monoxide is passed in. Simultaneously 20 g. 1-chloro-4-cyano-butene-2 and 11 cc. nickel carbonyl are introduced, over a period of about 3 hours. The solution becomes brown and nickel chloride is separated.

Acetone is distilled off, the residue is taken up again with water and the oil thus formed in separated; 13 g. 7-cyano-2,5-heptadienoic acid are extracted with sodium bicarbonate and then freed by treatment with sulfuric acid.

Example 5

In a 500 cc. flask identical with that illustrated in the preceding examples a mixture of 20 g. chlorocyanobutene and 15 g. nickel carbonyl in isopropyl alcohol is reacted at 45° C. while a current of 4 liters/h. CO and 6 liters/h. acetylene is passed through at the same.

After 4 hours' reaction isopropyl alcohol is distilled off, under a slight vacuum, the residue is taken up again with water, the oily layer is separated and distilled under a vacuum of 13 mm. Hg. At 160–165° C. 20 g. of a clear liquid consisting of the isopropyl ester of 7-cyano-2,5-heptadienoic acid are collected.

Analysis.—Found: C, 68.17; H, 8.01; N, 7.84. Calculated for $C_{11}H_{15}NO_2$: C, 68.37; H, 7.82; N, 7.25.

Example 6

50 cc. cyclohexanol are reacted at 45° C., under a stream of CO and acetylene, with 10 g. chlorocyanobutene and 6 cc. nickel carbonyl for 4 hours.

The product is distilled under vacuum in order to remove cyclohexanol, taken up with water, extracted with ether and distilled under a vacuum of 5 mm. Hg.

At 180–183° C. 7 grams of cyclohexyl ester of 7-cyano-2,5-heptadienoic acid, a viscous liquid containing dicyan-octadiene as an impurity, are collected.

Analysis.—Found: C, 70.78; H, 8.03; N, 6.82. Calculated for $C_{14}H_{19}NO_2$: C, 72.07; H, 8.21; N, 6.00.

Example 7

Into a flask kept at 35° C. by means of a water bath, 250 cc. acetone and 20 cc. water are introduced. The mixture is kept under agitation by a mechanical stirrer. Air is removed by means of an oxygen-free nitrogen stream and a gas stream consisting of 10 l./h. CO and 10 l./h. $C_2H_2$ is then introduced. Two acetone solutions containing 25 g. allyl chloride ($CH_2=CHCH_2Cl$) and 30 g. nickel carbonyl respectively are then added dropwise. The solution gradually assumes a brown yellow color. The addition of the reactants took 6 hours.

From the solution, nickel chloride crystals are separated. The mixture is kept at the aforementioned temperature for 1 hour, nitrogen is then passed again and the volatile compounds are distilled under a slight vacuum. The residue is taken again with water and extracted with ether.

The residual solution contains 3.9 g. nickel chloride, corresponding to 11.3 g. nickel carbonyl consumed.

By distilling the residue of the ether extract under a suction of 12 mm. Hg, 17 g. 2,5-hexadienoic acid are recovered at between 95 and 105° C. Acidimetric equivalent: 114.

Caproic acid is obtained by hydrogenating this acid with hydrogen on Pb at room temperature.

*Example 8*

Into a flask, provided with a mechanical stirrer and a reflux condenser, containing 400 cc. methyl alcohol, kept at 35° C. and through which a stream of 10 l./h. CO and 10 l./h. $C_2H_2$ is passed, 25 g. allyl chloride and 30 g. nickel carbonyl are added dropwise at the same time within 6 hours.

The solution assumes first a yellow and then a brown-red color. During the change in color the temperature rises. It is necessary to cool and to add the reactants gradually in order to control the heat of reaction.

After 1 hour the reaction mixture is washed with nitrogen and the volatile portion, which boils up to 80° C. under atmospheric pressure, is distilled under a slight vacuum.

The residue is taken again with water. The nickel content of the aqueous solution is 7.7 g., corresponding to a nickel carbonyl consumption of 21 g.

The product is taken up with ether, dried on sodium sulfate, and filtered. The ether is removed and the product is distilled. Under a vacuum of 12 mm. Hg, at between 35 and 40° C., there passes over a fraction of 16 g., containing methyl 2,5-hexadienoate.

This ester, by hydrogenation with hydrogen gas on Pd at room temperature, yields methyl caproate.

*Example 9*

In a flask containing 300 cc. ethyl alcohol, through which 10 l./h. CO and 10 l./h. $C_2H_2$ are passed, 25 g. allyl chloride and 30 g. nickel carbonyl in an ethanol solution are added, at 45° C. within 3 hours.

Operating as in the preceding example, 14 g. of a fraction having a boiling point of 50–55° C./10 mm. Hg and containing the ethyl ester of 2,5-hexadienoic acid, are obtained and 18 g. nickel carbonyl are consumed.

*Example 10*

In a flask containing 400 cc. isopropyl alcohol, into which 10 l./h. CO and 10 l./h. $C_2H_2$ are passed, two solutions of 25 g. allyl chloride and 30 g. nickel carbonyl in 100 cc. isopropyl alcohol are added at 40° C. within 4 hours.

Operating as in the preceding example, 16 g. of isopropyl ester of 2,5-hexandioic acid, with a boiling point of 36–42° C./5 mm. Hg, are obtained and 22 g. nickel carbonyl are consumed.

*Example 11*

In a flask containing 130 g. benzyl alcohol and 250 cc. acetone in which 10 l./h. CO and 10 l./h. $C_2H_2$, 25 g. allyl chloride and 30 g. nickel carbonyl in acetone solution are added at 40° C. within 4 hours.

Operating as in the preceding example, after benzyl alcohol, 20 g. of a fraction having a boiling point of 150–162° C./20 mm. Hg and containing the benzyl ester of 2,5-hexadienoic acid, are obtained. 17 g. nickel carbonyl are consumed.

*Example 12*

In a flask containing 100 cc. ethylene glycol and 300 cc. acetone, two acetone solutions of 25 g. allyl chloride and 30 g. nickel carbonyl are added at 40° C. within 4 hours under a stream of 10 l./h. CO and $C_2H_2$.

From the solution, nickel chloride crystals are separated. Operating as in the preceding example but after having washed the ether extract with water in order to remove ethylene glycol, 23 g. of glycol esters of 2,5-hexadienoic acid, mainly glycol monoester of 2,5-hexandoic acid, are distilled at between 80 and 120° C./8 mm. Hg.

*Example 13*

Two acetone solutions of 25 g. crotyl chloride $$(CH_3CH=CHCH_2Cl)$$

and 25 g. nickel carbonyl are reacted by introducing them at 30° C. into a flask containing 300 cc. acetone and 30 g. water while 10 l./h. CO and 10 l./h. $C_2H_2$ are passed through for 6 hours.

Nickel chloride crystals are separated from the solution. The products are separated by operating as in Example 7.

Under a vacuum of 15 mm. Hg, 19 g. of a fraction having a boiling point of 117–124° C. containing 2,5-heptadienoic acid, are distilled. Acidimetric equivalent 125. 14.8 g. nickel carbonyl are consumed.

Heptadienoic acid, by hydrogenation with hydrogen on Pd at room temperature, yields enantic acid.

*Example 14*

25 g. crotyl chloride and 25 g. nickel carbonyl are introduced at 30° within 6 hours into a flask, as in the preceding examples, containing 400 cc. methyl alcohol, while a stream of 10 l./h. CO and 10 l./h. $C_2H_2$ are passed through the same flask.

Operating as in Example 8, 28 g. of a raw product are obtained which, by distillation under a vacuum of 10 mm. Hg, yields 20 g. 2,5-heptadienoic acid methyl ester at 58–62° C. 14.5 g. nickel carbonyl are consumed.

Methyl heptadienoate, by hydrogenation on Pd at room temperature, yields methyl enantate.

*Example 15*

18 g. methyl ester of 5-chloro-3-pentenoic-1 acid

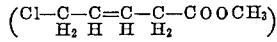

and 10 g. nickel carbonyl are reacted with methanol at 30° C. for 6 hours in the presence of 5 g. $MgCO_3$ under a stream of 5 l./h. CO and 5 l./h. $C_2H_2$. 2.7 g. nickel carbonyl are consumed. By vacuum distillation 13 g. are obtained, distilling at 133–138° C./8 mm. Hg and consisting of di-methyl ester of 2,5-octadiendioic-1,8 acid, of the formula previously described.

The reaction scheme is:

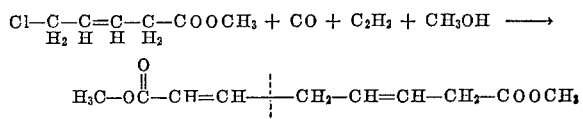

This ester by hydrogenation on Pd yields methyl suberate.

*Example 16*

30 g. 1-chloro-4-acetoxy butene-2

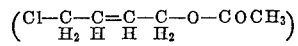

in methyl alcohol and 20 g. nickel carbonyl in methyl alcohol are introduced, while stirring, into a flask containing 300 cc. methyl alcohol and 8 g. magnesium carbonate. 10 l./h. CO and 10 l/h. $C_2H_2$ are then passed through the flask. The temperature is kept at 40° C. by means of a water bath. The addition of the reactants requires 4 hours. The reaction is continued for a total of 5 hours. 10 g. nickel carbonyl are consumed. 21 g. raw product are obtained, from which, by vacuum distillation, 14 g. of a fraction passing over at 120–130°

C./6 mm. Hg, and containing 7-acetoxy-2,5-heptadienoic methyl ester, are obtained.

Example 17

10 g. 1,8-dichloro-2,6-octadiene

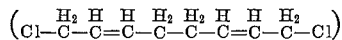

are reacted with 10 g. nickel carbonyl for 4 hours at 35° C. under CO and $C_2H_2$ in 200 cc. methyl alcohol.

By distillation at 200–210° C./10 mm. Hg, there is obtained about 3 g. tetradeca-2,5,9,12-tetraendioic methyl ester, of the structural formula previously described.

This product, by hydrogenation with hydrogen gas on Pd at room temperature, yields a white solid product melting at 41° C. and consisting of tetradecandioic methyl ester.

Example 18

In a small 1-liter glass reaction column with a diameter of 50 mm., 500 cc. methanol are introduced and a gaseous mixture containing 65% acetylene and 35% carbon monoxide is circulated at 40° C. in the same apparatus. In the cycle a 10 liter reservoir is inserted.

A solution of 200 cc. chlorocyanobutene in 500 cc. methanol and a solution of 45 cc. nickel carbonyl in 500 cc. methanol are then added within 7 hours. After 45 minutes the absorption is so great that the addition of further acetylene and carbon monoxide is required, which can be regulated to maintain the acetylene proportion at about 60%. The temperature is kept constant by circulating air in the jacket. The liquid which fills the reaction column flows out through an overflow and is collected in a suitable collector. When the reaction is completed nitrogen is passed through and the product is discharged.

The total consumption of nickel carbonyl, found as nickel chloride, corresponds to 20 g.

Methyl alcohol is distilled off and nickel chloride is separated as an aqueous solution; the product obtained is vacuum distilled, thus obtaining the following fractions: 9 g. distillation heads up to 140°/10 mm. Hg, 184 g. product distilled at 140–168° C./14 mm. Hg (containing 135 g. methyl ester 7-cyano-2,5-heptadienoic acid together with the saponification product 2,5-octadiendioic diester) and 11 g. tails distilling up to 178°/14 mm. Hg.

Example 19

300 cc. methyl alcohol are placed in the reaction column of the preceding example.

A mixture of 65% $C_2H_2$, and 35% CO is then circulated at a flow-rate of about 100 liters/h. Two solutions of 100 cc. methanol, one containing 20 g. chlorocyanobutene and the other 3 cc. nickel carbonyl, are then introduced within 3 hours. After 45 minutes the solution becomes darker until it assumes a brown-red color. Further CO and $C_2H_2$ are introduced maintaining the pressure of the cycle at 20 cm. $H_2O$ at the suction of the circulation pump and the acetylene proportion at about 65%. The temperature is kept at 40° C. When the reaction is completed the solution is discolored. The solution is discharged from the bottom of the column and the operation is repeated with the same amounts of reactants.

The entire product is transferred to a flask from which methanol is distilled off. Water is added and the nickel chloride solution is separated. The product collected in ethyl ether and dried on sodium sulfate is then distilled.

After 2.2 g. distillation heads containing unreacted chloro-cyanobutene, 49 g. distillate containing 7-cyano-2,5-heptadienoic methyl ester pass at 140–155° C./11 mm. Hg.

The nickel amount present is in the aqueous solution as nickel chloride is 2.07 g.

Example 20

300 cc. acetone and 300 cc. water are introduced into the reaction tube. CO and $C_2H_2$ are passed through as in the preceding example. Two acetone solutions, one containing 40 g. chlorocyanobutene and the other 7 cc. nickel carbonyl, are then introduced. Finally, the gas is discharged and the apparatus is washed with nitrogen. The reaction is carried out as in the preceding example. When the reaction is completed acetone is distilled, the product is separated from nickel chloride and treated with sodium carbonate, thus extracting the acid portion which is then freed by acidification with sulfuric acid and is mixed with ether.

The acid portion, containing 7-cyano-2,5-heptadienoic acid amounts to 34 g. The acidimetric equivalent is 165.

Example 21

300 cc. methanol are mixed with 30 g. hydrated nickel acetate. Under the conditions of Example 19 the mixture is reacted with CO, $C_2H_2$, $Ni(CO)_4$ (6 cc.) and chlorocyanobutene (40 g.).

37 g. of a distillate at between 140 and 160° C. (10 mm. Hg) are obtained.

The absorbed carbon monoxide corresponds to 5.14 liters. The nickel amount found in the solution and exceeding the starting nickel amount is 1 g.

Example 22

25 g. allyl chloride in 200 cc. methanol solution and 13 cc. nickel carbonyl in 100 cc. methanol solution are introduced within 3 hours into a reaction tube already containing 300 cc. methanol, under a stream of acetylene and carbon monoxide. The temperature is kept at 40° C.

After 3 hours of reaction the gas is discharged and the reaction mixture is washed with nitrogen.

The solution obtained is distilled at up to 80° C. and the residue obtained is collected in ether. From the distilled methanol a further product is obtained by treatment with saturated calcium chloride solution.

By vacuum distillation of the product of two runs, 28 g. 2,5-methyl hexadienoate, with a boiling point of 63–66° C. (34 mm. Hg), are obtained.

8 g. nickel are found in the solution as chloride.

Example 23

80 g. allyl chloride dilulted with 1200 cc. methanol together with 36 cc. nickel carbonyl in 400 cc. methanol are continuously passed in the reactor at 40–45° for 8 hours. The circulation of CO and $C_2H_2$ amounts to about 100 liters per hour.

By distilling the product and treating the alcohol with a calcium chloride solution, 50 g. are recovered, consisting of 2,5-methyl-hexadienoate. 17 g. nickel are found in the solution as chloride.

Example 24

Two solutions of 20 g. crotyl chloride and 9 cc. nickel carbonyl, each in 100 cc. methanol, are introduced into the reaction tube, containing 200 cc. methanol in which CO and $C_2H_2$ are circulated as in the preceding examples. The temperature during the reaction is kept at 30° C. The reaction time is 3 hours.

By distilling the reaction liquid, 13 g. methyl heptadienoate with a boiling point of 72–75° (20 mm. Hg) are obtained. 3.2 g. of nickel are consumed.

The invention is in part characterized as comprising a process for preparing compounds having the formula

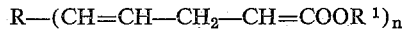

where $n$ is 1 or 2, R can be H ($n=1$) or a radical which is inert under the reaction conditions, containing from 0 to 20 carbon atoms and, if desired, substituents such as —CN, —OCOCH$_3$, —COOCH$_3$, etc. said radical being bound to the carbon atom carrying the double bond by means of a $CH_2$ group, and $R^1$ can be a radical of the alcohol type, selected from the class consisting of water, and aliphatic, cycloaliphatic, or arylaliphatic alcohols containing from 1 to 20 carbon atoms, this process being characterized in that the reaction of the chloro-derivatives having the formula R—(CH=CH—CH$_2$Cl)$_n$ with compounds corresponding to the radicals R' is carried out at between 0° and 75° C., preferably at between 25° and 60° C., by contacting the reactants preferably with an excess of acetylene, nickel carbonyl, carbon monoxide and hydroxy compounds in respect of the reacting chloro-derivative, and with a ratio of gaseous carbon monoxide to acetylene of 0.75 to 3. As stated in the introductory part of the specification, the synthesis employs less than the stoichiometric amount of nickel carbonyl theoretically required to form nickel chloride from the starting chloro-derivative. The process is further characterized in that, in order to facilitate the solubility and the mixing of the reactants, the reaction is carried out in the presence of solvents which are inert under the reaction conditions, such as acetone, cyclohexanone, dimethyl ether of ethylene glycol, etc. And it is further characterized in that buffers such as MgCO$_3$, CaCO$_3$, or NaH$_2$PO$_4$ are used which makes it possible to keep the pH lower than 7, since they react with the hydrochloric acid released during the reaction.

It may be seen that the specifically disclosed species of alcohols fall within the following class: alcohols taken from the group consisting of saturated aliphatic (Examples 1 and 5), saturated cycloaliphatic (Example 6), and aralkyl alcohols (Example 11), having no substituents other than alcoholic —OH (Example 12). These alcohols contain up to seven carbon atoms.

As described in my copending application Serial No. 765,734, filed October 7, 1958, U.S. Patent 2,978,466, issued April 4, 1961, the 7-cyano-2,5-heptadienoic-1 acid and its esters are readily hydrogenated with Raney nickel catalysts at ordinary temperatures or with palladium in a first stage hydrogenation of the double bond and nickel-chromium in a second stage hydrogenation of the nitrate group. The thus produced omega-amino caprylic acid and its esters are polymerizable by known methods, to produce polyamide fibers.

The following examples of said hydrogenation are taken from my copending application Serial No. 765,734.

*Example 1A*

20 g. methyl ester of 7-cyano-2,5-heptadienoic-1-acid are dissolved in methanol and after addition of 10 g. ammonia, are hydrogenated on 5 g. of Raney nickel in an autoclave.

The hydrogenation takes place readily at 50° C. The nickel is filtered off, alcohol is removed under vacuum, and a residue is obtained still containing nickel. A few drops of sodium hydroxide solution are added to destroy it. After extraction with ether, the methyl ester of omega-aminocaprylic acid is distilled with the fraction passing over at 110–120° (15 mm. Hg).

The formation of polycondensation products takes place at the same time.

*Analysis.*—Found: C, 62.0; H, 11.54; N, 7.94. Calculated for C$_9$H$_{19}$NO$_2$: C, 62.39; H, 11.05; N, 8.09.

*Example 2A*

14 g. of the methyl ester of 7-cyano-2,5-heptadienoic-1-acid are hydrogenated for 30 minutes at 30° in methanol solution under a hydrogen pressure of 30 atm. in the presence of 1 g. of catalyst, determined on the basis of supported palladium.

The palladium catalyst is filtered off and 5 g. of a catalyst on the basis of nickel-chromium and 0.3 g. NaOH are added. The hydrogenation is then continued for 30 minutes at 30° under a hydrogen pressure of 30 atm. The nickel is filtered off. The solution appears clear and colorless. Alcohol is distilled off and the solution is refluxed with 36% hydrochloric acid for 3 hours. It is then neutralized with sodium carbonate while heating and about 0.5 of a basic oil is extracted with ether.

The solution is then acidified with sulfuric acid, neutralized with ammonia, and dried. The residue is repeatedly extracted with absolute alcohol, eliminating the salt by filtration. The alcohol extract is dried, thus obtaining omega-aminocaprylic acid.

The hydrochloride of the acid melts at 145–146° C.

*Example 3A*

10 g. 7-cyano-2,5-heptadienoic-1-acid are neutralized with sodium bicarbonate and hydrogenated in an aqueous ethanol solution first on palladium and then with nickel chromium.

The solution is filtered, saponified with sulfuric acid, neutralized with ammonia and dried. The dry residue is extracted with alcohol as disclosed above. 8 g. omega-aminocaprylic acid are thus obtained.

I claim:
1. A process of preparing a compound of the group consisting of alpha-beta, delta-epsilon, diene-carboxylic acids and their esters of alcohols defined hereafter, comprising reacting a chloro-compound of the formula R—CH=CH—CH$_2$Cl, in which R is a radical taken from the group consisting of saturated hydrocarbon radicals having 1 to 20 carbon atoms and substituted by a —CN radical, with nickel carbonyl and acetylene at 0° to 75° C., the reaction being carried out in an hydroxylic medium, taken from the group consisting of an aqueous organic solvent, which solvent is inert in the reaction, and an alcohol containing from 1 to 20 carbon atoms taken from the group consisting of saturated aliphatic, saturated cycloaliphatic, and aralkyl alcohols, having no substituents other than alcoholic —OH, the acid being prepared when the said aqueous inert organic solvent is employed, the ester corresponding to the alcohol being prepared when said alcohol is employed.

2. The process of claim 1, the reaction being carried out in the presence of buffers to maintain the pH below 7, by reacting with the hydrogen chloride produced by the reaction.

3. A process for preparing an alpha-beta, delta-epsilon, diene-carboxylic acid ester comprising reacting an alcohol containing from 1 to 20 carbon atoms; a chloro-compound of the formula R—CH=CH—CH$_2$Cl, in which R is a saturated hydrocarbon radical having 1 to 20 carbon atoms and substituted by a —CN group, with nickel carbonyl, acetylene, and carbon monoxide at 0° to 75° C., said alcohol being taken from the group consisting of saturated aliphatic, saturated cycloaliphatic, and aralkyl alcohols having no substituents other than alcoholic —OH, the ester corresponding to said alcohol resulting from said process.

4. A process of preparing an alpha-beta, delta-epsilon diene carboxylic acid, comprising reacting a chloro-compound of the formula R—CH=CH—CH$_2$Cl, in which R is a saturated hydrocarbon radical having 1 to 20 carbon atoms and substituted by a —CN group, with nickel carbonyl, acetylene, and carbon monoxide at 0° to 75° C., the reaction being carried on in an aqueous organic solvent, which solvent is inert to the reaction.

5. The process of claim 4, the organic solvent being acetone.

6. A process of preparing the methyl ester of 7-cyano-2,5-heptadienoic acid-1, comprising reacting methyl alcohol, acetylene, nickel carbonyl and 1-chloro-4-cyano-butene-2, and recovering said methyl ester.

7. A process of preparing the methyl ester of 7-cyano-2,5-heptadienoic acid-1, comprising reacting methyl alcohol, acetylene, nickel carbonyl and 1-chloro-4-cyano-butene-2, the process being carried out between 0° C. and 75° C., and carbon monoxide being introduced with the reacting mixture.

8. A process of preparing 7-cyano-2,5-heptadienoic-1 acid, comprising reacting acetylene, nickel carbonyl, and 1-chloro-4-cyano-butene-2 at between 0° C. and 75° C., in an inert organic liquid diluent.

9. A process of preparing 7-cyano-2,5-heptadienoic-1 acid, comprising reacting acetylene, nickel carbonyl, and 1-chloro-4-cyano-butene-2 at between 0° C. and 75° C., in acetone and water.

10. A process of preparing an ester of 7-cyano-2, 5-heptadienoic acid, comprising reacting a compound having an alcoholic hydroxy group, acetylene, nickel carbonyl and 1-chloro-4-cyano-butene-2 at between about 0° C. and 75° C., in a liquid medium comprising said compound, said compound being taken from the group consisting of saturated aliphatic, saturated cycloaliphatic, and aralkyl alcohols having no substituents other than alcoholic —OH, and having up to twenty carbon atoms.

11. The process of claim 10, the compound being methyl alcohol.

12. The process of claim 10, the compound being isopropyl alcohol.

13. The process of claim 10, the compound being cyclohexanol.

14. A process of preparing an ester of 7-cyano-2,5-heptadienoic acid, comprising reacting a lower alkanol, acetylene, nickel carbonyl and 1-chloro-4-cyano-butene-2 at between about 0° C. and 75° C., in a liquid medium comprising said alkanol.

15. An ester of 7-cyano-2,5-heptadienoic-1 acid and an alcohol taken from the group consisting of saturated aliphatic, saturated cycloaliphatic, and aralkyl alcohols having no substituents other than alcoholic —OH, and having up to twenty carbon atoms.

16. The methyl ester of 7-cyano-2,5-heptadienoic-1 acid.

17. The isopropyl ester of 7-cyano-2,5-heptadienoic-1 acid.

18. The cyclohexyl ester of 7-cyano-2,5-heptadienoic-1 acid.

19. The 7-cyano-2,5-heptadienoic-1 acid.

References Cited in the file of this patent

UNITED STATES PATENTS

| | | |
|---|---|---|
| 2,484,067 | Boese | Oct. 11, 1949 |
| 2,613,222 | Specht et al. | Oct. 7, 1952 |
| 2,778,848 | Neuman et al. | Jan. 22, 1957 |
| 2,811,551 | Coffman et al. | Oct. 29, 1957 |

OTHER REFERENCES

Modern Plastics, November 1945, pages 162–163.